US010371856B1

(12) United States Patent
Kasevich et al.

(10) Patent No.: US 10,371,856 B1
(45) Date of Patent: Aug. 6, 2019

(54) ZERO DEAD-TIME GRAVIMETER

(71) Applicant: AOSense, Inc., Sunnyvale, CA (US)

(72) Inventors: Mark A. Kasevich, Palo Alto, CA (US); Miroslav Y. Shverdin, Mountain View, CA (US)

(73) Assignee: AOSense, Inc., Sunnyvale, CA (US)

( * ) Notice: Subject to any disclaimer, the term of this patent is extended or adjusted under 35 U.S.C. 154(b) by 180 days.

(21) Appl. No.: 15/430,982

(22) Filed: Feb. 13, 2017

(51) Int. Cl.
*G01V 7/00* (2006.01)
*G01V 7/02* (2006.01)
*G01V 7/04* (2006.01)
*G01V 7/06* (2006.01)

(52) U.S. Cl.
CPC ............ *G01V 7/04* (2013.01); *G01V 7/02* (2013.01); *G01V 7/06* (2013.01); *G01V 7/005* (2013.01)

(58) Field of Classification Search
CPC ... G01V 7/02; G01V 7/04; G01V 7/06; G01V 7/005
See application file for complete search history.

(56) References Cited

U.S. PATENT DOCUMENTS

2017/0329043 A1* 11/2017 Bhongale ............... E21B 47/10

OTHER PUBLICATIONS

Gouet, J. Le, et al. "Limits to the sensitivity of a low noise compact atomic gravimeter" Applied Physics B—Laser and Optics, Springer Verlag, 2008, 92 (2), pp. 133-144. (Year: 2008).*

* cited by examiner

*Primary Examiner* — Paul M. West
(74) *Attorney, Agent, or Firm* — Van Pelt, Yi & James LLP

(57) ABSTRACT

An atomic gravimeter device includes one or more lasers and three or more atomic sources. The three or more atomic sources are disposed to launch or drop atoms vertically. The one or more lasers are disposed to generate laser beams that interact with sets of atoms from an atomic source of the three or more atomic sources to measure accelerations of the sets of atoms. A measured value is determined for gravity using interwoven acceleration measurements of the sets of atoms from the three or more atomic sources.

29 Claims, 8 Drawing Sheets

ZERO DEAD-TIME GRAVIMETER

The invention was made with Government support. The Government has certain rights in the invention.

BACKGROUND OF THE INVENTION

Atomic gravimeters based on light pulse atom interferometry are capable of precise absolute gravitational acceleration measurements. They typically operate by launching atoms in a vertical fountain or dropping atoms and measuring their acceleration using multiple interrogating laser pulses to divide, deflect, and subsequently recombine atomic trajectories. The resulting atom interference pattern provides a very sensitive mapping between the gravitational acceleration experienced by the atoms and the final quantum state of the atoms. In more detail, atoms are first caught in a magneto-optical trap and cooled, then launched vertically or dropped by reconfiguring the laser beam parameters (e.g., amplitude, frequency, etc.) of the trap. Three or more laser interrogation pulses are applied as the atoms travel under the influence of gravity. After the interferometer interrogation sequence is complete, the gravitational acceleration experienced by the atoms determines the probability for atoms to be in a particular quantum state, which may be probed by one or more detection laser beams, e.g. by measuring resonant fluorescence. Once the measurement is complete, a new batch of atoms must be loaded into the trap and launched for a subsequent measurement. Measurements are made sequentially in order to average out noise such as vibrations of the mounting platform or technical noise. The sensor measurement comprises a measurement of the acceleration plus noise between the first and last interferometer interrogation pulse. In a conventional atom interferometer sequence, no measurement is performed between the last measurement pulse and the first measurement pulse of the next measurement, during which time the trap is reloaded, cooled prior to launch, and then is launched from the trap toward the interferometer region. The so-called dead-time during which no measurement is made creates a problem in the case of uncorrelated noise between successive measurements (e.g., because it is not known what happened while the noise was not being measured). Uncertainty as a result of averaging uncorrelated noise measurements decreases at the rate of the inverse of the square root of the number of measurements, which is very slow.

BRIEF DESCRIPTION OF THE DRAWINGS

Various embodiments of the invention are disclosed in the following detailed description and the accompanying drawings.

DETAILED DESCRIPTION

Figure 1A:
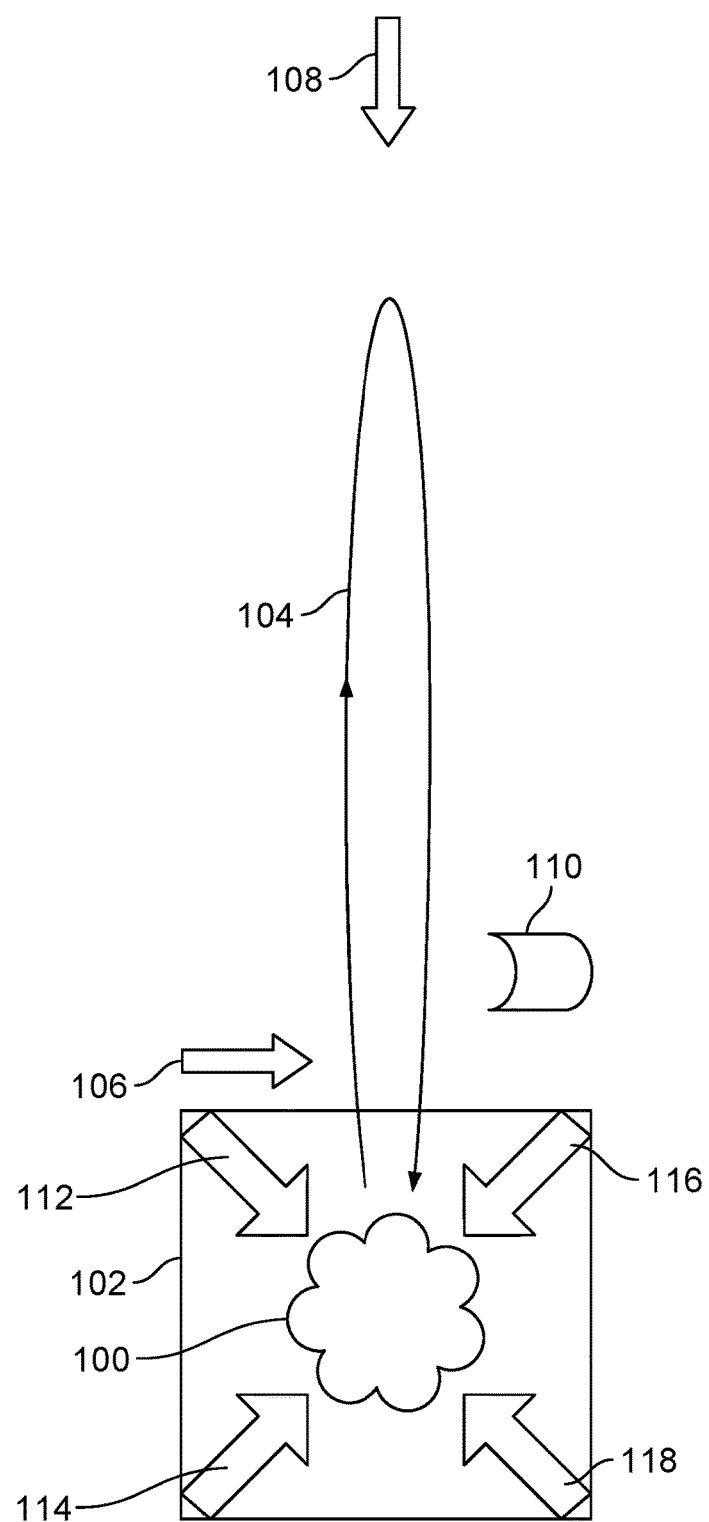
FIG. 1A is a diagram illustrating an embodiment of an atomic gravimeter.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An atomic gravimeter device is disclosed. The atomic gravimeter device comprises one or more lasers and three or more atomic fountains. The three or more atomic fountains are disposed to launch atoms vertically. The one or more lasers are disposed to generate laser beams that interact with and interrogate the sets of atoms launched by each atomic fountain of the three or more atomic fountains to measure accelerations of the sets of atoms. A measured value is determined for gravity using interwoven acceleration measurements of the sets of atoms from the three or more atomic fountains.

In some embodiments, an atomic gravimeter performs a measurement of gravity by cooling atoms in a magneto-optical trap, launching the atoms vertically, and performing a set of interferometric measurements on the group of atoms to determine the acceleration of the atoms as they rise and/or fall. In some embodiments, three laser pulses equally spaced in time interact with the atoms, followed by detection light to determine the probability distribution of atomic states. A computation is performed using the measured probability distribution data to determine a measurement of the acceleration of gravity. In some embodiments, some of the atoms are recaptured after they fall back into the trap, and subsequently cooled, and launched again for use in another measurement. Recapture can increase the total number of atoms participating in the interferometer measurement, improving the signal to noise ratio. In some embodiments, atoms are discarded after a measurement and other atoms are loaded into the trap rather than recapturing those from the previous measurement. During the time from the final interferometer interrogation pulse of a first cycle to the first interferometer interrogation pulse of a next cycle, no information about gravity or the noise applied to the gravimeter is captured. In some embodiments, the zero dead-time (ZDT) gravimeter comprises three standard atomic gravimeter assemblies with launching cycles evenly staggered such that measurements are performed by the three gravimeters at the same time (e.g., at the same time the first gravimeter performs its third measurement, the second gravimeter performs its second measurement, and the third gravimeter performs its first measurement). In some embodiments, the three measurements are performed approximately at the same time (e.g., separated in time by a very small amount). During any part of the cycle, two of the three gravimeters are performing a measurement of acceleration and one of the three gravimeters is experiencing dead-time. By averaging together the measurements taken by the three gravimeters, a continuous measurement of gravity is achieved. The measurements of noise applied to the gravimeter are correlated, causing the measured uncertainty to decrease at the rate of $$\frac{1}{t},$$

as compared with $$\frac{1}{\sqrt{t}}$$

for uncorrelated noise measurements, where t is the time between measurements. Platform vibration noise is one example of a correlated noise source. A random positional displacement of the platform is the same for all three gravimeters. Hence in a ZDT configuration, the sensor will average down vibrational noise at the rate of $$\frac{1}{t}.$$

Other correlated sources include but are not limited to reference oscillator instability and RF frequency noise on the laser beams operating the interferometer. In some embodiments, more than three gravimeters are used, and the arguments herein may be extended to larger numbers of gravimeters in a straightforward manner.

In some embodiments, each atomic fountain of the three or more atomic fountains is disposed to launch atoms vertically. In some embodiments, the three gravimeters are housed in a single vacuum chamber. Each set of atoms launched by each atomic fountain of the three or more atomic fountains is interrogated by a laser beam generated by a laser of the one or more lasers disposed to interact with the set of atoms to measure acceleration of the set of atoms. Measurements of acceleration of atoms from the three or more atomic fountains are interwoven to eliminate dead-time between measurements and used to determine a measured value for gravity.

In some embodiments, a zero dead-time atomic gravimeter comprises three or more atomic fountains, wherein each atomic fountain cyclically launches and collects atoms, and wherein the launching cycle of the atomic fountains is staggered. In various embodiments, staggering is at intervals of T, is lightly staggered by a small delta, or any other appropriate time interval either regular or irregular. In some embodiments, the one or more lasers comprise three or more lasers, each laser providing interrogation laser pulses to one of the three or more atomic fountains. In some embodiments, the one or more lasers comprise one laser providing interrogation laser pulses to all of the three or more atomic fountains. In some embodiments, the laser beam interrogates each set of atoms launched by each atomic fountain of the three or more atomic fountains using three laser pulses. In some embodiments, the three laser pulses are evenly spaced in time with period T. In some embodiments, a first laser pulse interrogates a first set of atoms launched by a first atomic fountain of the three or more atomic fountains, a second laser pulse interrogates a second set of atoms launched by a second atomic fountain of the three or more atomic fountains, and a third laser pulse interrogates a third set of atoms launched by a third atomic fountain of the three or more atomic fountains, and wherein the first laser pulse interrogates the first set of atoms, the second laser pulse interrogates the second set of atoms, and the third laser pulse interrogate the third set of atoms simultaneously. In some embodiments, the three laser pulses provided to each atomic fountain occur in a sequence of a sequence laser pulse 1, a sequence laser pulse 2, and sequence laser pulse 3. In some embodiments, a start of the sequence for the three laser pulses is staggered for the three or more atomic fountains. In some embodiments, the first laser pulse comprising a sequence laser pulse 1 interrogates the first set of atoms, the second laser pulse comprising a sequence laser pulse 2 interrogates the second set of atoms, and the third laser pulse comprising a sequence laser pulse 3 interrogates the third set of atoms simultaneously. In some embodiments, the first laser pulse comprising a sequence laser pulse 2 interrogates the first set of atoms, the second laser pulse comprising a sequence laser pulse 3 interrogates the second set of atoms, and the third laser pulse comprising a sequence laser pulse 1 interrogates the third set of atoms simultaneously. In some embodiments, the first laser pulse comprising a sequence laser pulse 3 interrogates the first set of atoms, the second laser pulse comprising a sequence laser pulse 1 interrogates the second set of atoms, and the third laser pulse comprising a sequence laser pulse 2 interrogates the third set of atoms simultaneously. In some embodiments, the atomic gravimeter comprises a state preparation laser for preparing a quantum state of the set of atoms after the set of atoms is launched from an atomic fountain of the three or more atomic fountains. In some embodiments, the atomic gravimeter comprises a state detector laser beam for measuring a quantum state of the set of atoms after undergoing the interferometer interrogation sequence. In some embodiments, a measurement of the quantum state of the set of atoms comprises a measurement of an acceleration of the set of atoms. In some embodiments, a measurement of the acceleration of atoms is determined once per launch for each atomic fountain of the three or more atomic fountains. In some embodiments, the measured value for gravity is determined by averaging measurements of the acceleration of atoms from the three or more atomic fountains. In some embodiments, the atomic gravimeter device comprises an auxiliary accelerometer for measuring acceleration noise applied to the atomic gravimeter device, and the auxiliary accelerometer may be used to operate the atom sensors in a closed-loop servo and to avoid phase ambiguity of the atom sensors.

FIG. 1A is a diagram illustrating an embodiment of an atomic gravimeter. In some embodiments, the atomic gravimeter of FIG. 1A comprises a conventional atomic gravimeter, e.g., an atomic gravimeter comprising a launching cycle including dead-time. In the example shown, atomic cloud 100 is loaded into magneto-optical trap 102. In some embodiments, the atoms comprising atomic cloud 100 are provided by an atomic source. Magneto-optical trap 102 comprises a magneto-optical trap for cooling atomic cloud 100. In some embodiments, magneto-optical trap 102 comprises a set of one or more lasers and one or more magnets configured to cool an atomic cloud. In some embodiments, the lasers and/or magnets of magneto-optical trap 102 are adjustable in order to change the effect of magneto-optical trap 102 on atomic cloud 100. Magneto-optical trap 102 is capable of launching atomic cloud 100 vertically by reconfiguring its laser energy. In some embodiments, once atomic cloud 100 is sufficiently cooled by magneto-optical trap 102, magneto-optical trap 102 reconfigures or adjusts its lasers (e.g., as shown laser 112, laser 114, laser 116, and laser 118, and other lasers not shown—for example, perpendicular to the page) to launch atomic cloud 100 straight up and back down (e.g., a path indicated by arc 104). In some embodiments, atomic cloud 100 returns to magneto-optical trap 102 and is retrapped and recooled. Immediately after atomic cloud 100 is launched from magneto-optical trap 102, atoms of atomic cloud 100 receive laser light from state preparation laser 106. In some embodiments, state preparation laser 106 puts atoms of atomic cloud 100 into the same quantum state. In some embodiments, state preparation laser 106 puts atoms of atomic cloud 100 into a magnetically insensitive quantum state. As atomic cloud 100 is traveling vertically, atom interferometer beams 108 from one or more atom interferometer lasers delivers a set of interferometer pulses to it. In some embodiments, the one or more atom interferometer lasers deliver three or more interferometer pulses to atomic cloud 100 as it is traveling. In some embodiments, the pulses are uniformly spaced in time (e.g., with a constant time T between pulses). When the one or more atom interferometer lasers deliver a resonant detection pulse to atomic cloud 100, atomic fluorescence detected by state detector 110 comprises a measurement of acceleration of the atoms. In some embodiments, the one or more atom interferometer lasers deliver pulses three times from when atomic cloud 100 is launched until when it returns to magneto-optical trap 102. In some embodiments, the time from the final atom interferometer laser pulse of a measurement until the first atom interferometer laser pulse of a next measurement (e.g., during the period when atomic cloud 100 is being retrapped, recooled, and relaunched), comprises dead-time (e.g., time when a measurement is not being conducted).

Figure 1B:
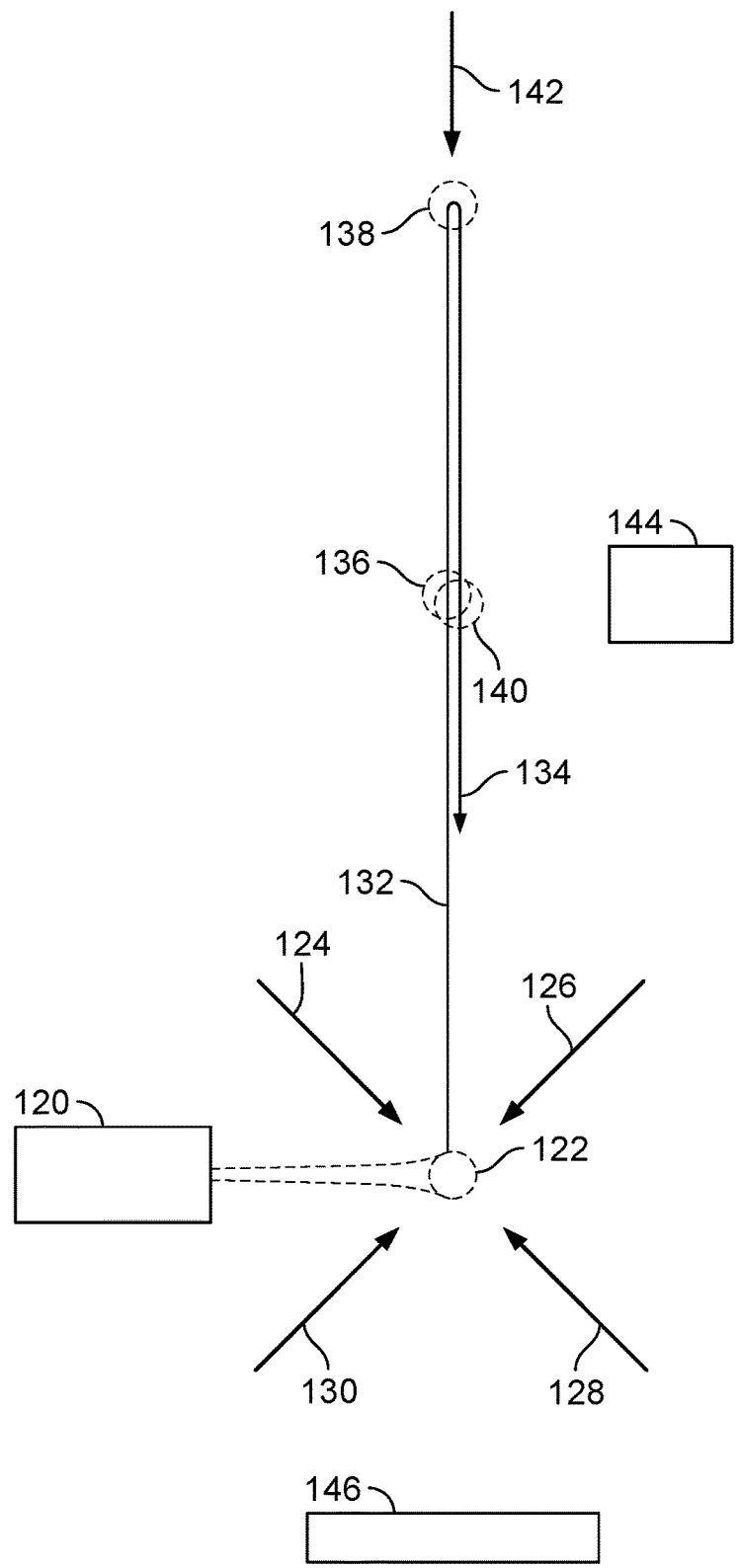
FIG. 1B is a diagram illustrating an embodiment of an atomic gravimeter.

FIG. 1B is a diagram illustrating an embodiment of an atomic gravimeter. In some embodiments, the atomic gravimeter of FIG. 1B comprises a conventional atomic gravimeter, e.g., an atomic gravimeter comprising a launching cycle including dead-time. In the example shown, atom source 120 is disposed to deliver atoms ultimately to be launched or dropped vertically. Atom source 120 delivers sets of atoms to cooling region 122. Atom cooling beams (e.g., atom cooling beam 124, atom cooling beam 126, atom cooling beam 128, and atom cooling beam 130 and others—for example, beams perpendicular to the page, not shown) create a cold cloud of atoms in cooling region 122. The cooling beams are switched to launch the cold cloud of atoms along path 132. The cloud of atoms is interrogated by the atom interferometer beams 142 three or more times per measurement cycle (e.g., location 136, location 138, and location 140). The measurement is made using atom fluorescence detector 144. The signal from atom fluorescence detector 144 is processed to yield a gravity value. Atom interferometer beams 142 are reflected off mirror 146 so the light interrogates the atom clouds twice.

Figure 2:
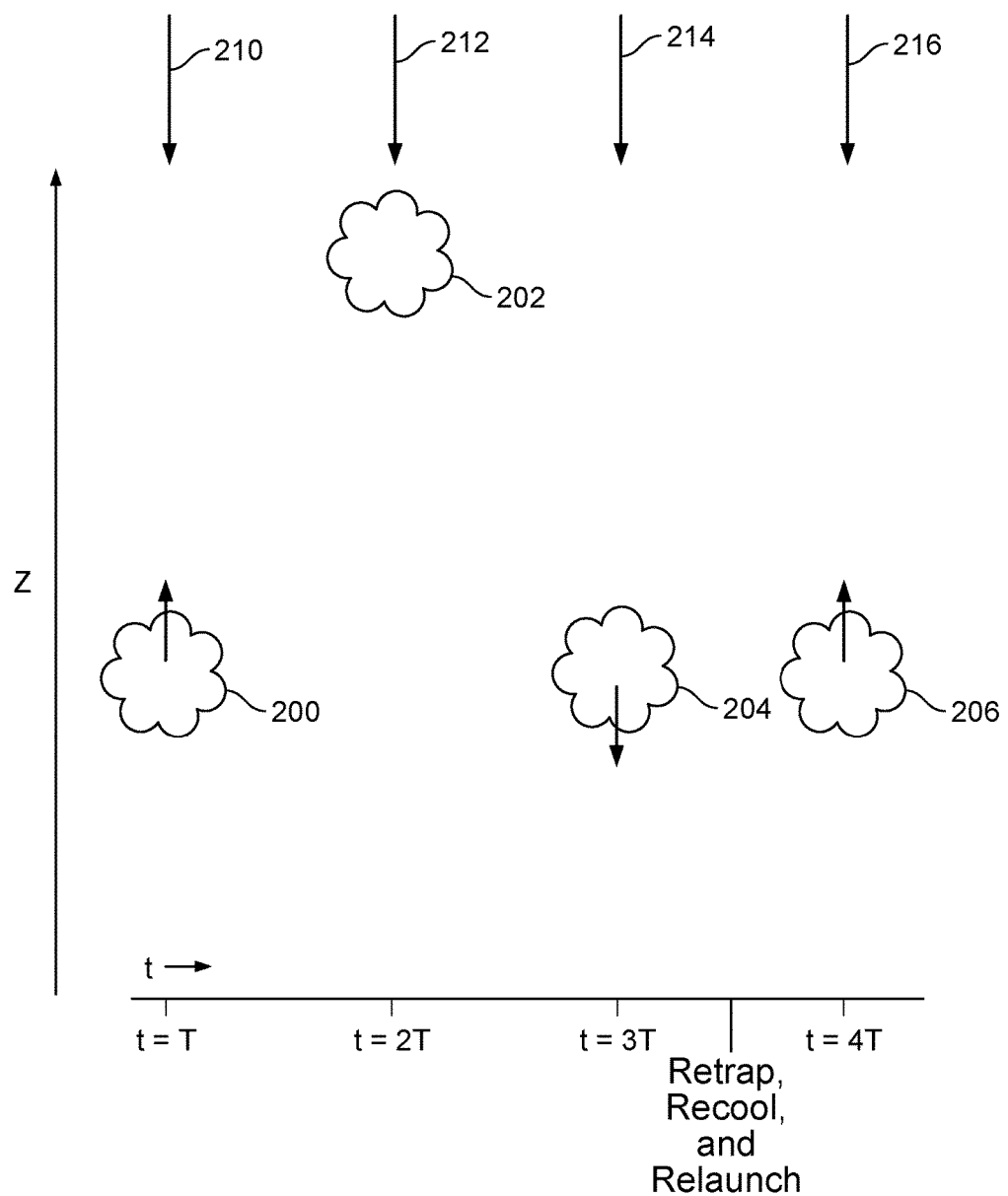
FIG. 2 is a diagram illustrating the flight of an atomic cloud.

FIG. 2 is a diagram illustrating the flight of an atomic cloud. In some embodiments, atomic cloud 200 comprises atomic cloud 100 of FIG. 1 after launching. In the example shown, atomic cloud 200, atomic cloud 202, atomic cloud 204, and atomic cloud 206 are not actually shaped as in FIG. 2, but are actually Gaussian in cross section density along the x-axis, the y-axis, and the z-axis. Atomic cloud 200 is shown at positions it occupies along its flight in the z-direction at the time of each measurement. Atomic cloud 200 is shown at time t=T, e.g., the time of a first laser pulse traveling along beam path 210; atomic cloud 202 comprises atomic cloud 200 at time t=2T, e.g., the time of a second laser pulse traveling along beam path 212; atomic cloud 204 comprises atomic cloud 200 at time t=3T, e.g., the time of a third laser pulse traveling along beam path 214, and atomic cloud 206 comprises atomic cloud 200 at time t=4T, e.g., the time of a fourth laser pulse traveling along beam path 216. In the example shown, atomic cloud 200 is shown shortly after launching, and is ascending. Atomic cloud 202 is shown at or near its apex and is relatively still (it can be helpful to have a small velocity to create a Doppler shift and make the frequencies needed for Doppler sensitive and Doppler insensitive transitions nondegenerate). Atomic cloud 204 is shown descending; atomic cloud 206 is shown with the same position and velocity as atomic cloud 200 (e.g., after the atomic cloud is retrapped, recooled, and relaunched).

In some embodiments, three gravimeters (G1, G2, and G3) have the following measurement sequence from startup to steady interwoven states:

Time=0T—load atoms, trap atoms, and cool atoms for G1;

Time=0.5T—Launch atoms for G1;

Time=1.0T—First interferometer pulse G1; Load atoms, trap atoms, and cool atoms for G2;

Time=1.5T—Launch atoms for G2;

Time=2.0T—Second interferometer pulse G1; First interferometer pulse G2; Load atoms, trap atoms, and cool atoms for G3;

Time=2.5T—Launch atoms for G3;

Time=3.0T—Third interferometer pulse G1 (Detection); Second interferometer pulse G2; First interferometer pulse G3; Load atoms, trap atoms, and cool atoms for G1;

Time=3.5T—Launch atoms for G1; (in some cases retrap/recool/relaunch)

Time=4.0—First interferometer pulse G1; Third interferometer pulse G2, Second interferometer pulse G3; Load atoms, trap atoms, and cool atoms for G2;

Time=4.5T—Launch atoms for G2; (in some cases retrap/recool/relaunch)

Time=5.0T—Second interferometer pulse G1; First interferometer pulse G2; Third interferometer pulse G3; Load atoms, trap atoms, and cool atoms for G3;

Time=5.5T—Launch atoms for G3; (in some cases retrap/recool/relaunch)

Time=6.0T—Third interferometer pulse G1 (Detection); Second interferometer pulse G2; First interferometer pulse G3; Load atoms, trap atoms, and cool atoms for G1; and repeat starting with Time 3.5T for continuous interwoven no dead-time operation. In some embodiments, the sequence is caused using a controller of the system.

Figure 3:
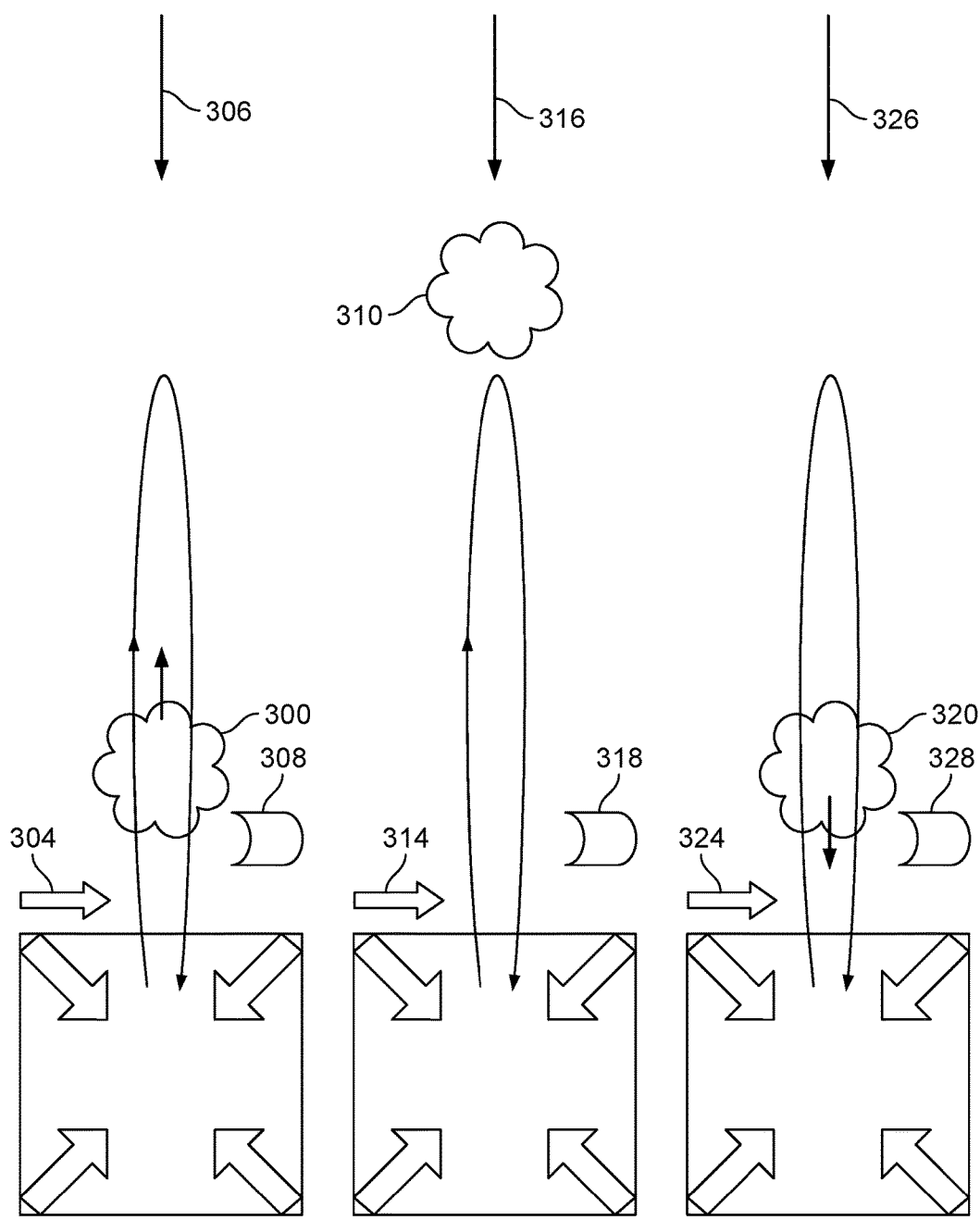
FIG. 3 is a diagram illustrating an embodiment of a zero dead-time atomic gravimeter.

FIG. 3 is a diagram illustrating an embodiment of a zero dead-time atomic gravimeter. In some embodiments, the zero dead-time atomic gravimeter of FIG. 3 comprises three instances of the atomic gravimeter of FIG. 1. In the example shown, a first atomic gravimeter comprises atomic cloud 300, magneto-optical trap 302, state preparation laser 304, atom interferometer beams 306, and state detector 308. A second atomic gravimeter comprises atomic cloud 310, magneto-optical trap 312, state preparation laser 314, atom interferometer beams 316, and state detector 318; a third atomic gravimeter comprises atomic cloud 320, magneto-optical trap 322, state preparation laser 324, atom interferometer beams 326, and state detector 328. In the example shown, the three atomic gravimeters of FIG. 3 operate simultaneously and out of phase. In some embodiments, the three atomic gravimeters are configured for simultaneous interferometer pulses (e.g., atom interferometer beams 306, atom interferometer beams 316, and atom interferometer beams 326 are configured to provide pulses simultaneously). In some embodiments, the three atomic gravimeters are configured for nearly simultaneous interferometer pulses (e.g., the difference in time between atom interferometer beam pulses is very small, e.g., much less than T, the time between measurement pulses of an individual atom interferometer laser). In the example shown, the three atomic gravimeters of FIG. 3 have simultaneous interferometer pulses, but atoms are at different positions within the measurement cycle. At the instant shown in FIG. 3, atomic cloud 300 is in a first measurement position (e.g., at the position of atomic cloud 200 of FIG. 2), atomic cloud 310 is in a second measurement position (e.g., at the position of atomic cloud 202 of FIG. 2), and atomic cloud 312 is in a third measurement position (e.g., at the position of atomic cloud 204 of FIG. 2). As time passes, the three gravimeters cycle through the three measurement positions—for example, at time T past the instant shown in FIG. 3, atomic cloud 300 is in a second measurement position (e.g., at the position of atomic cloud 202 of FIG. 2), atomic cloud 310 is in a third measurement position (e.g., at the position of atomic cloud 204 of FIG. 2), and atomic cloud 320 is in a first measurement position (e.g., at the position of atomic cloud 200 of FIG. 2). A measurement is completed by each atomic gravimeter each time the measurement of the third measurement position is performed (e.g., at the time of each measurement pulse, one of the three atomic gravimeters determines a measurement of acceleration).

Figure 4:
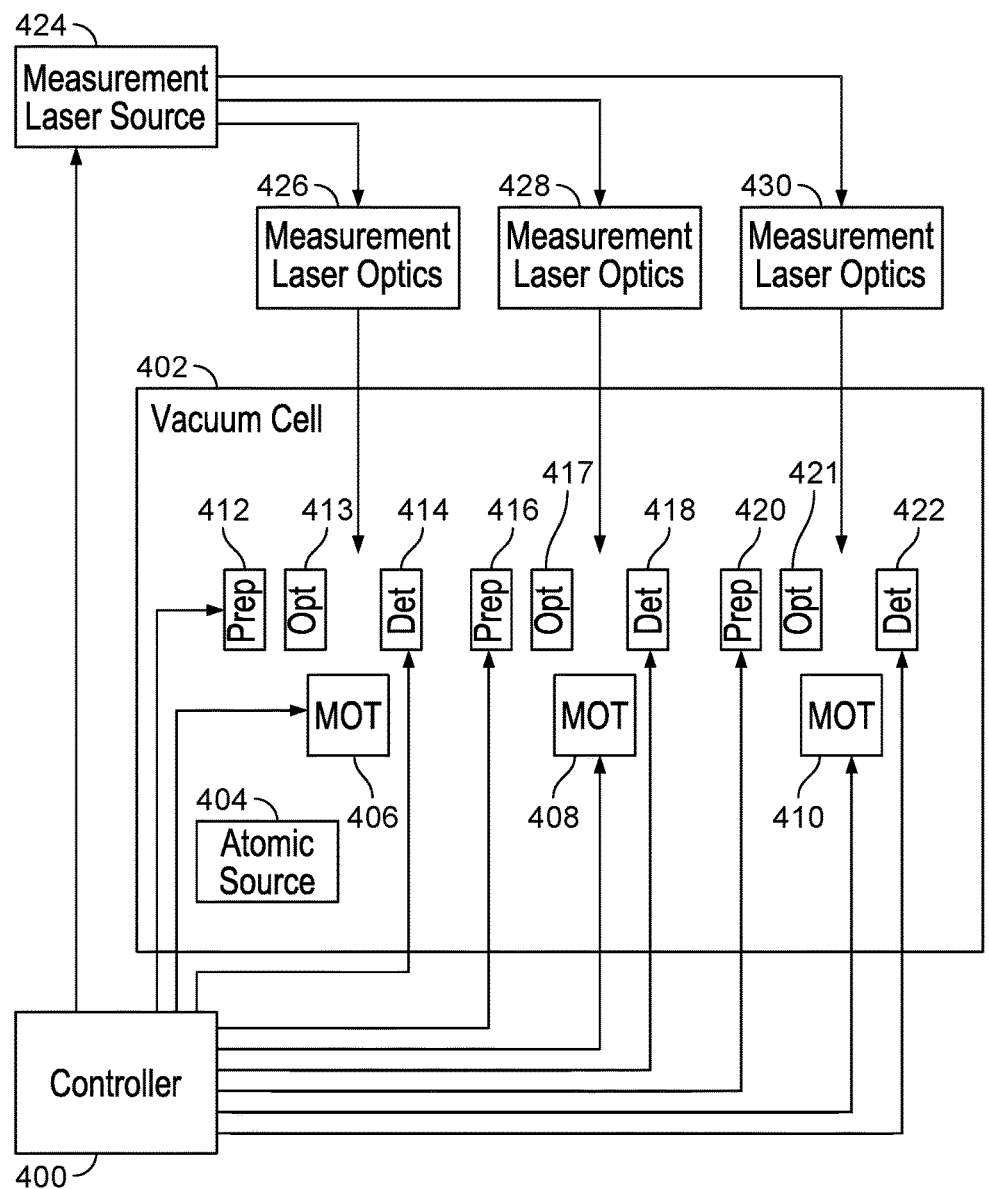
FIG. 4 is a block diagram illustrating an embodiment of a zero dead-time atomic gravimeter.

FIG. 4 is a block diagram illustrating an embodiment of a zero dead-time atomic gravimeter. In some embodiments, the block diagram of FIG. 4 comprises a block diagram of the zero dead-time gravimeter of FIG. 3. In the example shown, the zero dead-time atomic gravimeter comprises vacuum cell 402, comprising atomic source 404 and three atomic fountains. In various embodiments, vacuum cell 402 comprises one, two, three, four, or any other appropriate number of atomic sources. In various embodiments, vacuum cell 402 comprises one, two, three, four, or any other appropriate number of atomic fountains. In the example shown, atomic source 404 provides an atomic vapor to be captured by magneto-optical trap (MOT) 406, MOT 408, and MOT 410. In some embodiments, atomic source 404 comprises a source for alkali metal atoms (e.g., lithium, sodium, potassium, rubidium, cesium, francium, etc.). In some embodiments, atomic source 404 comprises a source for any other appropriate atoms. In some embodiments, atomic source 404 may include a 2D-magneto-optic trap (2D-MOT) to expedite loading the 3D-MOT and minimize background vapor at the 3D-MOT. Measurement laser source 424 is disposed to provide laser pulses for measuring the acceleration of atomic clouds within each atomic fountain of the set of atomic fountains of vacuum cell 402, via a set of measurement laser optics (e.g., measurement laser optics 426, measurement laser optics 428, and measurement laser optics 430) associated with each atomic fountain. In some embodiments, controller 400 causes launching or dropping of sets of atoms from atomic sources and/or atomic traps. In various embodiments, measurement laser source 424 comprise one, two, three, or more laser sources disposed to provide laser pulses for interaction with sets of atoms to establish states and/or make a laser interferometry measurement. In the example shown, vacuum cell 402 comprises three atomic fountains. A first atomic fountain comprises MOT 406, state preparation laser 412, preparation laser optics 413, and state detection 414, and is interrogated by laser pulses provided by measurement laser source 424 and the light is guided to the first atomic fountain by measurement laser optics 426. State detection 414 includes optics to gather light and relay the light to a photo detector. MOT 406 includes optics and/or laser sources to cool and launch atoms from atomic source 404. A second atomic fountain comprises MOT 408, state preparation laser 416, preparation laser optics 417, and state detection 418, and is interrogated by laser pulses provided by measurement laser source 424 and the light is guided to the first atomic fountain by measurement laser optics 428. State detection 418 includes optics to gather light and relay the light to a photo detector. MOT 408 includes optics and/or laser sources to cool and launch atoms from atomic source 404. A third atomic fountain comprises MOT 410, state preparation laser 420, preparation laser optics 421, and state detection 422 and is interrogated by laser pulses provided by measurement laser source 424 and the light is guided to the first atomic fountain by measurement laser optics 430. State detection 422 includes optics to gather light and relay the light to a photo detector. MOT 410 includes optics and/or laser sources to cool and launch atoms from atomic source 404. Controller 400 comprises a controller for controlling the zero dead-time atomic gravimeter. In various embodiments, controller 400 provides control information to measurement laser source 424 indicating and/or causing when and to which set of measurement laser optics a laser pulse should be provided; indications to state preparation laser 412, state preparation laser 416, and state preparation laser 420 indicating when to turn on and when to turn off; indications to MOT 406, MOT 408, and MOT 410 indicating when to go to trapping mode and when to go to launching mode. Controller 400 additionally comprises a controller for receiving measurements from state detector 414, state detector 418, and state detector 422. In some embodiments, probe laser source 424 is configured to provide laser pulses to measurement laser optics 426, measurement laser optics 428, and measurement laser optics 430 simultaneously. In some embodiments, measurement laser source 424 is configured to provide laser pulses to measurement laser optics 426, measurement laser optics 428, and measurement laser optics 430 sequentially (e.g., one after the next, separated in time by a short time dt). In some embodiments, a delay in time dt between laser pulses provided to a first measurement laser optics (e.g., measurement laser optics 426) and a second measurement laser optics (e.g., measurement laser optics 428) comprises a very short delay (e.g., very short compared with T, the time between a first pulse provided to a first probe laser optics and a second pulse provided to the first probe laser optics). In some embodiments, in the event laser pulses are provided sequentially to the probe laser optics (e.g., and not simultaneously), the system will have slightly degraded performance due to additional sensitivity to noise at $$> \frac{1}{dt}.$$

In the event dt<<T, the added noise components will be at frequencies far above any vibrational components desired to be measured, and will be easily removed from the measurement using a filter. The gravity signal is obtained from the detector output. In its simplest form, the detector measures the atomic fluorescence: a fraction of the optical radiation emitted by the atom cloud after applying a laser beam tuned to the atomic resonance. Using one of multiple available techniques, the fluorescence signal recorded on a photodiode detector is converted to interferometer phase. This process is similar to obtaining interferometer phase of an optical interferometer. Once the interferometer phase, $\phi_I$, is measured, it is converted to the local acceleration measurement. $a=\phi_I/(k_{\mathit{eff}} *T^2)$. Here, a is the local acceleration, T is the interferometer interrogation time, $$k_{\mathit{eff}} = \frac{4\pi}{\lambda}$$

is the effective wave-vector, and $\lambda$ is the wavelength of the applied laser light.

In some embodiments, the zero dead-time atomic gravimeter of FIG. 4 additionally comprises an auxiliary accelerometer (e.g., a microelectromechanical system—for example, a MEMS accelerometer, a capacitive accelerometer, a laser accelerometer, a piezoelectric accelerometer, etc.). In some embodiments, the measurement of the auxiliary accelerometer is used in a feed-forward loop to extend the dynamic range of the zero dead-time atomic gravimeter. This allows operating the zero dead-time atomic gravimeter in a high vibrational noise environment. The dynamic range of an atomic gravimeter is limited by $2\pi$ phase ambiguity such that an instrument with interrogation time T can measure a maximum acceleration $$a_{RMS} = \frac{2\pi}{k_{\mathit{eff}} T^2} = \lambda/(2T^2),$$

where $\lambda$ is the wavelength of the applied laser light. For typical parameters, $a_{RMS}$<10 to 100 µg. An auxiliary accelerometer can be selected to have very high dynamic range, up to several g or more. In this configuration, the auxiliary sensor will resolve the phase ambiguity of the atomic gravimeter and will extend its dynamic range to $a=\phi_{Total}/(k_{\mathit{eff}} T^2)$, where $\phi_{Total}=2\pi N+\phi_I$. Here $\phi_{Total}$ is the total accumulated phase. The atomic gravimeter measures $\phi_I$, where $0<\phi_I<2\pi$. The auxiliary sensor is used to measure the value of N.

Figure 5A:
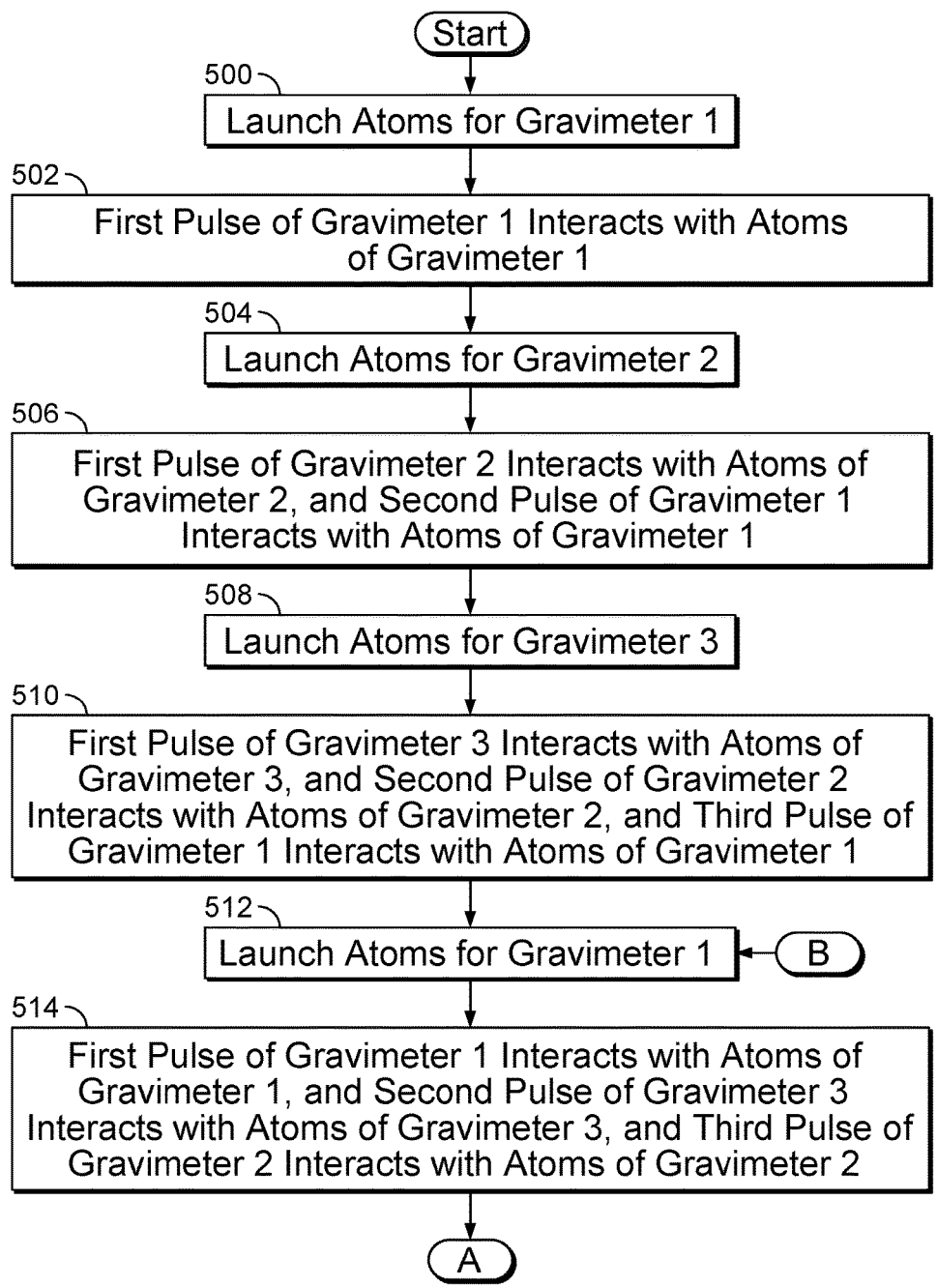
FIGS. 5A and 5B are flow diagrams illustrating an embodiment of a process for a zero dead-time atomic gravimeter.
Figure 5B:
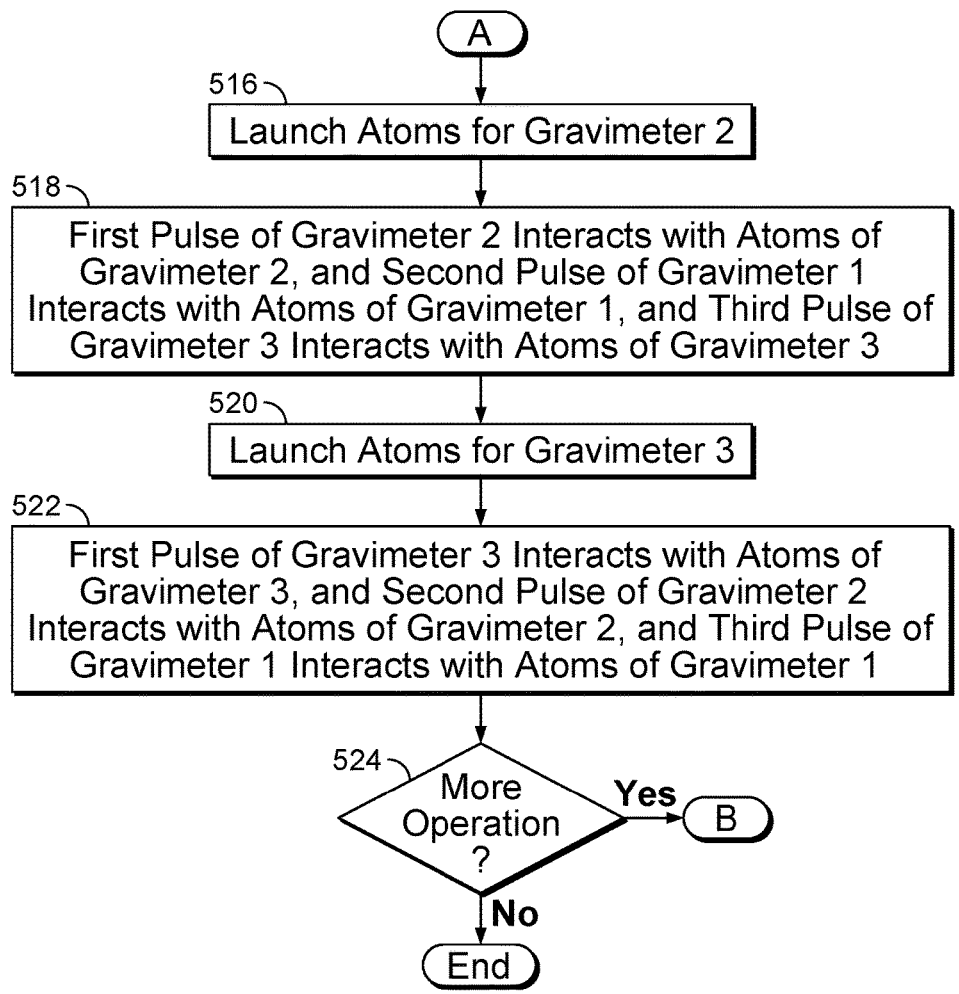

FIGS. 5A and 5B are flow diagrams illustrating an embodiment of a process for a zero dead-time atomic gravimeter. In some embodiments, the process of FIGS. 5A and 5B comprise a process for the zero dead-time atomic gravimeter of FIG. 3 in which the start of the sequence for measurements have a staggered start so that the measurements are interwoven and thereby eliminate dead-time. In the example shown in FIG. 5A, in 500, atoms for gravimeter 1 are launched. For example, an atomic vapor is loaded into a first magneto-optical trap and a first atomic cloud is launched from the first magneto-optical trap of the first gravimeter. In 502, a first pulse of gravimeter 1 interacts with atoms of gravimeter 1. For example, the first pulse of the atom interferometer laser interacts with the atom cloud of the first gravimeter. In 504, atoms for gravimeter 2 are launched. For example, an atomic vapor is loaded into a second magneto-optical trap and an atomic cloud is launched from the magneto-optical trap of the second gravimeter. In 506, a first pulse of gravimeter 2 interacts with atoms of gravimeter 2 and a second pulse of gravimeter 1 interacts with atoms of gravimeter 1. For example, the second pulse of the atom interferometer laser interacts with the atom cloud of the first gravimeter and the first pulse of the atom interferometer laser interacts with the atom cloud of the second gravimeter. In 508, atoms for gravimeter 3 are launched. For example, an atomic vapor is loaded into a third magneto-optical trap and an atomic cloud is launched from the magneto-optical trap of the third gravimeter. In 510, a first pulse of gravimeter 3 interacts with atoms of gravimeter 3, a second pulse of gravimeter 2 interacts with atoms of gravimeter 2, and a third pulse of gravimeter 1 interacts with atoms of gravimeter 1. For example, the first pulse of atom interferometer laser interacts with the atom cloud of the third gravimeter, the second pulse of atom interferometer laser interacts with the atom cloud of the second gravimeter, and the third pulse of atom interferometer laser interacts with the atom cloud of the first gravimeter. In 512, atoms for gravimeter 1 are launched. For example, an atomic vapor is loaded into a first magneto-optical trap and an atomic cloud is launched from the magneto-optical trap of the first gravimeter. In 514, a first pulse of gravimeter 1 interacts with atoms of gravimeter 1, a second pulse of gravimeter 3 interacts with atoms of gravimeter 3, and a third pulse of gravimeter 2 interacts with atoms of gravimeter 2, and control passes to 516 of FIG. 5B. For example, the first pulse of atom interferometer laser interacts with the atom cloud of the first gravimeter, the second pulse of atom interferometer laser interacts with the atom cloud of the third gravimeter, and the third pulse of atom interferometer laser interacts with the atom cloud of the second gravimeter.

In the example shown in FIG. 5B, in 516 atoms for gravimeter 2 are launched. For example, an atomic vapor is loaded into a second magneto-optical trap and an atomic cloud is launched from the magneto-optical trap of the second gravimeter. In 518, a first pulse of gravimeter 2 interacts with atoms of gravimeter 2, a second pulse of gravimeter 1 interacts with atoms of gravimeter 1, and a third pulse of gravimeter 3 interacts with atoms of gravimeter 3. For example, the first pulse of the atom interferometer laser interacts with the atom cloud of the second gravimeter, the second pulse of the atom interferometer laser interacts with the atom cloud of the first gravimeter, and the third pulse of the atom interferometer laser interacts with the atom cloud of the third gravimeter. In 520 atoms for gravimeter 3 are launched. For example, an atomic vapor is loaded into a third magneto-optical trap and an atomic cloud is launched from the magneto-optical trap of the third gravimeter. In 522, a first pulse of gravimeter 3 interacts with atoms of gravimeter 3, a second pulse of gravimeter 2 interacts with atoms of gravimeter 2, and a third pulse of gravimeter 1 interacts with atoms of gravimeter 1. For example, the first pulse of the atom interferometer laser interacts with the atom cloud of the third gravimeter, the second pulse of the atom interferometer laser interacts with the atom cloud of the second gravimeter, and the third pulse of the atom interferometer laser interacts with the atom cloud of the first gravimeter.

In 524, it is determined whether there are more operations. In the event that there are no more operations, then the process ends. In the event that there are more operations, then the control passes to 512 of FIG. 5A.

In some embodiments, a check for further operations happens at any point in the process and the process ends in the event that operations are determined not to continue. In some embodiments, in the event that there are no more operations, the process winds down with every launched set of atoms completing their measurement sequence but with no new atoms launched.

Figure 6:
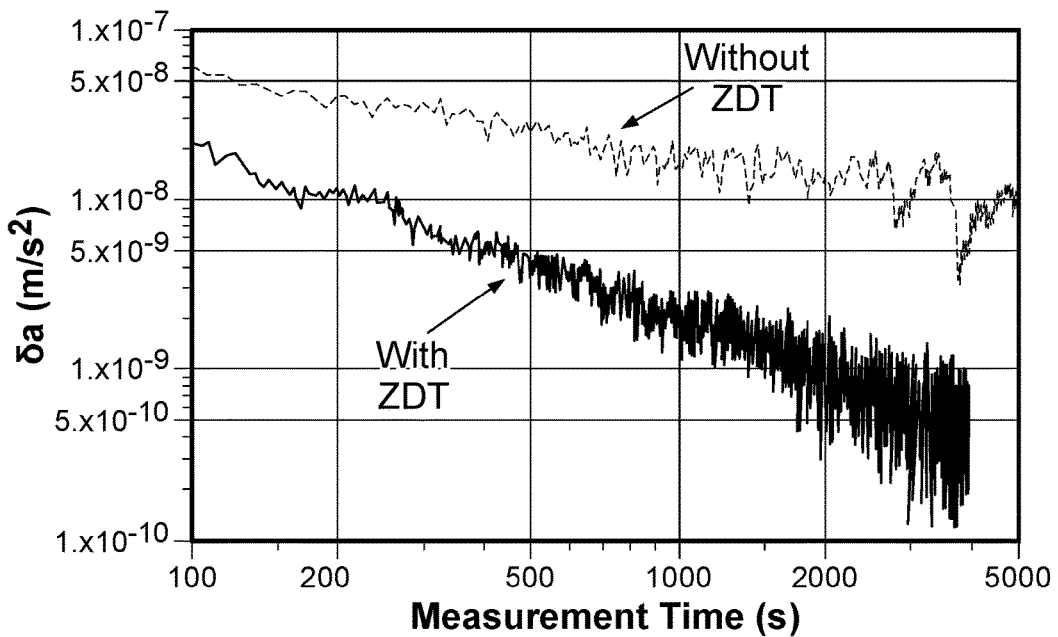
FIG. 6 is a diagram illustrating an example of an embodiment of simulated data of noise averaging for an atomic gravimeter as compared with a zero dead-time atomic gravimeter.

FIG. 6 is a diagram illustrating an example of an embodiment of simulated data of noise averaging for an atomic gravimeter as compared with a zero dead-time atomic gravimeter. In some embodiments, the diagram of FIG. 6 illustrates noise performance of the atomic gravimeter of FIG. 1 in comparison with the zero dead-time atomic gravimeter of FIG. 3. In the example shown, the upper data line shows the noise performance of an atomic gravimeter and the lower data line shows the noise performance of a zero dead-time atomic gravimeter. The line associated with the atomic gravimeter is seen to decrease at the rate of $$\frac{1}{\sqrt{t}},$$

and the line associated with the zero dead-time atomic gravimeter is seen to decrease at the rate of $$\frac{1}{t}.$$

In the example shown, after 1000 seconds of measurement time, the non-zero dead-time atomic gravimeter comprises a measurement uncertainty of $$2 \times 10^{-8} \frac{m}{s^2},$$

compared with $$2 \times 10^{-9} \frac{m}{s^2}$$

for the zero dead-time atomic gravimeter.

Figure 7:
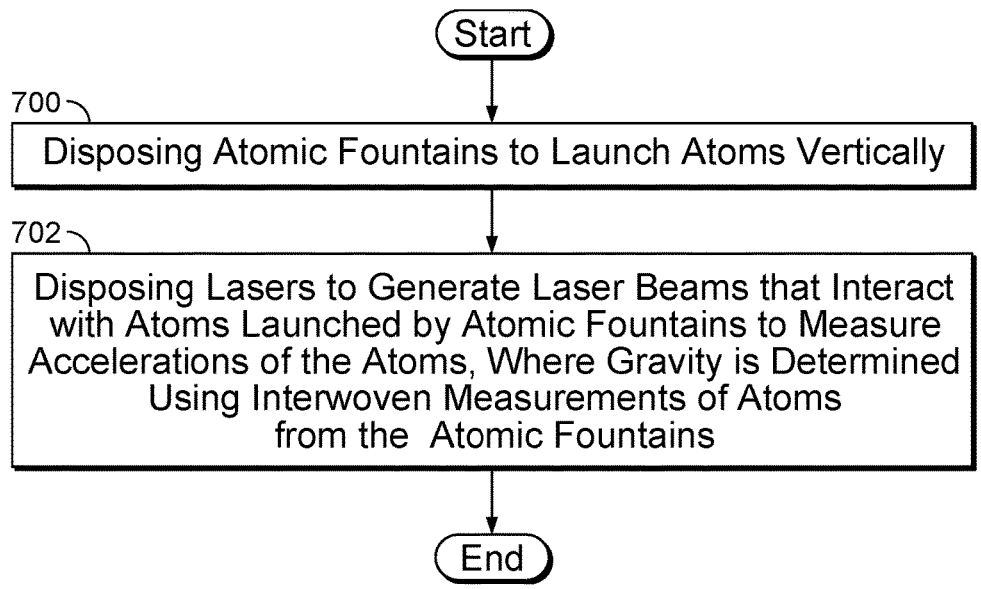
FIG. 7 is a diagram illustrating an embodiment of a process for an atomic gravimeter device.

FIG. 7 is a diagram illustrating an embodiment of a process for an atomic gravimeter device. In the example shown in 700, atomic fountains are disposed to launch atoms vertically. For example, the atomic fountains are positioned such that atoms cooled in the atomic fountain are projected upward vertically or dropped downward vertically. More than one fountain (e.g., 2, 3, 4, 5, or 6 fountains, etc.) may all be positioned inside a single vacuum chamber. In some embodiments, more than one vacuum chamber may be used to house the fountains, though a single chamber may achieve better commonality of the interferometer laser reference. The atomic fountains launch their atoms in a staggered sequence so that interwoven measurements can be made. In 702, lasers are disposed to generate laser beams that interact with atoms launched by atomic fountains to measure accelerations of the atoms, where gravity is determined using interwoven measurements of atoms from the atomic fountains. For example, lasers are positioned such that one or more laser beams enter the vacuum chamber and interact with the atomic fountains. In some embodiments, a laser beam interrogates a set of atoms multiple times to measure acceleration (e.g., acceleration of gravity).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An atomic gravimeter device, comprising:
   one or more lasers; and
   three or more atomic sources, wherein the three or more atomic sources are disposed to launch or drop atoms vertically, wherein the one or more lasers are disposed to generate laser beams that interact with sets of atoms from an atomic source of the three or more atomic sources to measure accelerations of the sets of atoms, wherein a measured value is determined for gravity using interwoven acceleration measurements of the sets of atoms from the three or more atomic sources, wherein a sequence of three or more laser pulses interrogate each set of atoms from each atomic source of the three or more atomic sources, wherein the three or more laser pulses provided to each atomic source occur in a sequence of a sequence 1 laser pulse, a sequence 2 laser pulse, and sequence 3 laser pulse, each separated by a time T, wherein a start of the sequence for the three or more laser pulses is staggered for the three or more atomic sources.

2. The atomic gravimeter device of claim 1, wherein the one or more lasers comprise one or more interrogation laser beams, each interrogation laser beam providing interrogation laser pulses to one or more of the three or more atomic sources.

3. The atomic gravimeter device of claim 1, wherein the one or more lasers comprise one laser providing interrogation laser pulses to all of the three or more atomic sources.

4. The atomic gravimeter device of claim 1, wherein the three or more laser pulses are evenly spaced in time with period T.

5. The atomic gravimeter device of claim 1, wherein a pulse within the sequence of the three or more laser pulses is applied simultaneously to interrogate sets of atoms of each of the three or more atomic sources.

6. The atomic gravimeter device of claim 1, wherein the three or more atomic sources are enclosed in a single vacuum chamber.

7. The atomic gravimeter device of claim 1, further comprising a state preparation laser for preparing a quantum state of the set of atoms after the set of atoms is launched or dropped from an atomic source of the three or more atomic sources.

8. The atomic gravimeter device of claim 1, further comprising a state detector for measuring a quantum state of the set of atoms after interrogating the set of atoms with an interferometer laser pulse sequence.

9. The atomic gravimeter device of claim 8, wherein a measurement of the quantum state of the set of atoms comprises an acceleration measurement of an acceleration of the set of atoms.

10. The atomic gravimeter device of claim 8, wherein three measurements of the quantum state of the set of atoms comprises a continuous measurement of the acceleration of gravity over a duration of the three measurements of the quantum state of the set of atoms.

11. The atomic gravimeter device of claim 1, wherein an acceleration measurement of the acceleration of atoms is determined once per launch or drop from each atomic source of the three or more atomic sources.

12. The atomic gravimeter device of claim 1, wherein the measured value for gravity is determined by averaging measurements of the acceleration of atoms from the three or more atomic sources.

13. A method for measuring using an atomic gravimeter device, comprising:
    causing three or more atomic sources to launch or drop atoms vertically; and
    causing one or more lasers to generate laser beams that interact with sets of atoms from an atomic source of the three or more atomic sources to measure accelerations of the sets of atoms, wherein a measured value is determined for gravity based on interwoven acceleration measurements of the sets of atoms from the three or more atomic sources, wherein a sequence of three or more laser pulses interrogate each set of atoms from each atomic source of the three or more atomic sources, wherein the three or more laser pulses provided to each atomic source occur in a sequence of a sequence 1 laser pulse, a sequence 2 laser pulse, and sequence 3 laser pulse, each separated by a time T, wherein a start of the sequence for the three or more laser pulses is staggered for the three or more atomic sources.

14. A computer program product for measuring using an atomic gravimeter device, the computer program product being embodied in a non-transitory computer readable storage medium and comprising computer instructions for:
    causing three or more atomic sources to launch or drop atoms vertically; and
    causing one or more lasers to generate laser beams that interact with sets of atoms from an atomic source of the three or more atomic sources to measure accelerations of the sets of atoms, wherein a measured value is determined for gravity based on interwoven acceleration measurements of the sets of atoms from the three or more atomic sources, wherein a sequence of three or more laser pulses interrogate each set of atoms from each atomic source of the three or more atomic sources, wherein the three or more laser pulses provided to each atomic source occur in a sequence of a sequence 1 laser pulse, a sequence 2 laser pulse, and sequence 3 laser pulse, each separated by a time T, wherein a start of the sequence for the three or more laser pulses is staggered for the three or more atomic sources.

15. An atomic gravimeter device, comprising:
    one or more lasers;
    three or more atomic sources, wherein the three or more atomic sources are disposed to launch or drop atoms vertically, wherein the one or more lasers are disposed to generate laser beams that interact with sets of atoms from an atomic source of the three or more atomic sources to measure accelerations of the sets of atoms, wherein a measured value is determined for gravity using interwoven acceleration measurements of the sets of atoms from the three or more atomic sources; and
    a state detector for measuring a quantum state of the set of atoms after interrogating the set of atoms with an interferometer laser pulse sequence, wherein three measurements of the quantum state of the set of atoms comprises a continuous measurement of the acceleration of gravity over a duration of the three measurements of the quantum state of the set of atoms.

16. The atomic gravimeter device of claim 15, wherein the one or more lasers comprise one or more interrogation laser beams, each interrogation laser beam providing interrogation laser pulses to one or more of the three or more atomic sources.

17. The atomic gravimeter device of claim 15, wherein the one or more lasers comprise one laser providing interrogation laser pulses to all of the three or more atomic sources.

18. The atomic gravimeter device of claim 15, wherein a sequence of three or more laser pulses interrogate each set of atoms from each atomic source of the three or more atomic sources.

19. The atomic gravimeter device of claim 18, wherein the three or more laser pulses are evenly spaced in time with period T.

20. The atomic gravimeter device of claim 18, wherein a pulse within the sequence of the three or more laser pulses is applied simultaneously to interrogate sets of atoms of each of the three or more atomic sources.

21. The atomic gravimeter device of claim 18, wherein the three or more laser pulses provided to each atomic source occur in a sequence of a sequence 1 laser pulse, a sequence 2 laser pulse, and sequence 3 laser pulse, each separated by a time T.

22. The atomic gravimeter device of claim 21, wherein a start of the sequence for the three or more laser pulses is staggered for the three or more atomic sources.

23. The atomic gravimeter device of claim 15, wherein the three or more atomic sources are enclosed in a single vacuum chamber.

24. The atomic gravimeter device of claim 15, further comprising a state preparation laser for preparing a quantum state of the set of atoms after the set of atoms is launched or dropped from an atomic source of the three or more atomic sources.

25. The atomic gravimeter device of claim 15, wherein a measurement of the quantum state of the set of atoms comprises an acceleration measurement of an acceleration of the set of atoms.

26. The atomic gravimeter device of claim 15, wherein an acceleration measurement of the acceleration of atoms is determined once per launch or drop from each atomic source of the three or more atomic sources.

27. The atomic gravimeter device of claim 15, wherein the measured value for gravity is determined by averaging measurements of the acceleration of atoms from the three or more atomic sources.

28. A method for measuring using an atomic gravimeter device, comprising:
    causing three or more atomic sources to launch or drop atoms vertically;
    causing one or more lasers to generate laser beams that interact with sets of atoms from an atomic source of the three or more atomic sources to measure accelerations of the sets of atoms, wherein a measured value is determined for gravity based on interwoven acceleration measurements of the sets of atoms from the three or more atomic sources; and causing a state detector to measure a quantum state of the set of atoms after interrogating the set of atoms with an interferometer laser pulse sequence, wherein three measurements of the quantum state of the set of atoms comprises a continuous measurement of the acceleration of gravity over a duration of the three measurements of the quantum state of the set of atoms.

29. A computer program product for measuring using an atomic gravimeter device, the computer program product being embodied in a non-transitory computer readable storage medium and comprising computer instructions for:

causing three or more atomic sources to launch or drop atoms vertically;

causing one or more lasers to generate laser beams that interact with sets of atoms from an atomic source of the three or more atomic sources to measure accelerations of the sets of atoms, wherein a measured value is determined for gravity based on interwoven acceleration measurements of the sets of atoms from the three or more atomic sources; and causing a state detector to measure a quantum state of the set of atoms after interrogating the set of atoms with an interferometer laser pulse sequence, wherein three measurements of the quantum state of the set of atoms comprises a continuous measurement of the acceleration of gravity over a duration of the three measurements of the quantum state of the set of atoms.

\* \* \* \* \*